(12) United States Patent
Katoh et al.

(10) Patent No.: US 7,771,145 B2
(45) Date of Patent: Aug. 10, 2010

(54) METHOD AND APPARATUS FOR MACHINING DEEP HOLE

(75) Inventors: Kouichi Katoh, Numazu (JP); Takamasa Itoh, Shizuoka-Ken (JP)

(73) Assignee: Toshiba Kikai Kabushiki Kaisha, Tokyo (JP)

(*) Notice: Subject to any disclaimer, the term of this patent is extended or adjusted under 35 U.S.C. 154(b) by 346 days.

(21) Appl. No.: 12/039,074

(22) Filed: Feb. 28, 2008

(65) Prior Publication Data
US 2008/0213056 A1    Sep. 4, 2008

(30) Foreign Application Priority Data
Mar. 1, 2007   (JP) .............. 2007-051614

(51) Int. Cl.
   B23B 35/00  (2006.01)
   B23B 41/02  (2006.01)
(52) U.S. Cl. .............. 408/1 R; 408/56; 408/59; 408/61; 408/705
(58) Field of Classification Search ........... 408/1 R, 408/56–61, 3, 8, 705; B23Q 11/10; B23B 41/02, B23B 51/06
See application file for complete search history.

(56) References Cited
U.S. PATENT DOCUMENTS

| | | | | |
|---|---|---|---|---|
| 4,076,442 A | * | 2/1978 | Cox et al. ............ | 408/8 |
| 4,529,340 A | * | 7/1985 | O'Dell .............. | 408/1 R |
| 5,006,021 A | * | 4/1991 | Wheetley ............ | 408/1 R |
| 5,174,692 A | * | 12/1992 | Martin .............. | 408/56 |
| 5,595,462 A | * | 1/1997 | Hensley ............. | 409/132 |
| 5,660,510 A | * | 8/1997 | Taniguchi et al. ....... | 409/136 |
| 6,874,977 B2 | * | 4/2005 | Cook et al. ........... | 408/1 R |
| 7,476,066 B2 | * | 1/2009 | Topf ............... | 408/56 |

FOREIGN PATENT DOCUMENTS

| DE | 3937216 A1 * | 5/1991 |
|---|---|---|
| JP | 54114878 A * | 9/1979 |
| JP | 63260744 A * | 10/1988 |

* cited by examiner

*Primary Examiner*—Daniel W Howell
(74) *Attorney, Agent, or Firm*—DLA Piper LLP (US)

(57) ABSTRACT

There is provided a method for machining a deep hole, which enables prevention of scattering of a coolant and efficient discharge of shavings.

The deep hole machining method includes: feeding a spindle to a deep hole machining start position while jetting a coolant toward a workpiece from an external normal pressure coolant supply line; closing the external normal pressure coolant supply line and opening a spindle normal pressure coolant supply line at the start of machining of a deep hole, and machining the deep hole to a predetermined intermediate depth while supplying a coolant to a machining point; and closing the spindle normal pressure coolant supply line and opening a high-pressure coolant supply line when the depth of the hole machined has reached the intermediate depth, and machining the deep hole to the final depth while supplying a high-pressure coolant to a machining point.

7 Claims, 2 Drawing Sheets

METHOD AND APPARATUS FOR MACHINING DEEP HOLE

BACKGROUND OF THE INVENTION

1. Field of the Invention

The present invention relates to a method and apparatus for machining a deep hole, and more particularly to a method and apparatus for machining a deep hole which, when machining a deep hole in a workpiece with a gun drill, can optimize the supply of a coolant according to the machining stage.

2. Background Art

A drill is generally used in machining of a hole in a workpiece, and a gun drill is widely employed to machine a deep hole in a workpiece. For example, when machining a mold for molding of a large-sized resin product, such as an instrument panel or a bumper of an automobile, deep hole machining with a gun drill is carried out to machine a cooling hole or a slide core hole for insertion of an extrusion pin.

Deep hole machining with a gun drill have specific problems: For example, a coolant becomes harder to reach the tip of the gun drill and discharge of shavings becomes difficult as a hole becomes deeper.

In machining of a deep hole with a gun drill, it is a conventional method to allow a coolant to pass through a passage extending axially within the gun drill and jet at a high pressure from the tip of the gun drill, thereby supplying the coolant to a machining point and discharging shavings.

According to conventional practice, the high-pressure coolant is blown on a workpiece from the start of machining of a deep hole, and the pressure of the coolant is kept constant during the machining. This involves the problem of too much scattering of the coolant upon its collision with the workpiece as well as the problem of decrease in the effect of discharging shavings with the progress of machining to a deeper hole. Especially in the case of a deep hole to be machined in a large-sized mold such as for use in molding of an instrument panel or a bumper of an automobile, it is necessary to use a long gun drill, for example having a length of not less than 70 mm, making it difficult to discharge shavings.

SUMMARY OF THE INVENTION

It is therefore an object of the invention to provide a method and apparatus for machining a deep hole, which solves the above problems in the prior art and enables prevention of scattering of a coolant and efficient discharge of shavings by switching the pressure of a coolant between a high pressure and a normal pressure, increasing the flow rate of a coolant, or selectively using an internal coolants which is fed through an internal passage of a gun drill, and an external coolant which is jetted from outside the gun drill, according to the stage of progress of machining of a deep hole.

In order to achieve the object, the present invention provides a method for machining a deep hole in a workpiece by means of a machine tool having a gun drill mounted to a spindle, said method comprising: connecting a coolant supply system to the spindle, the system comprising a spindle normal pressure coolant supply line for supplying a coolant at a normal pressure to a coolant passage passing in the interior of the spindle and extending to the tip of the gun drill, an external normal pressure coolant supply line for supplying a coolant at a normal pressure to a nozzle provided outside the spindle, and a high-pressure coolant supply line which joins the coolant passage in the spindle and supplies a coolant, whose pressure is higher than the normal pressure, to the coolant passage; feeding the spindle to a deep hole machining start position while jetting the coolant toward the workpiece from the external normal pressure coolant supply line; closing the external normal pressure coolant supply line and opening the spindle normal pressure coolant supply line at the start of machining of the deep hole, and machining the deep hole to a predetermined intermediate depth while supplying the coolant to a machining point; and closing the spindle normal pressure coolant supply line and opening the high-pressure coolant supply line when the depth of the hole machined has reached the intermediate depth, and machining the deep hole to the final depth while supplying the high-pressure coolant to a machining point.

The present invention also provides an apparatus for machining a deep hole in a workpiece with a gun drill mounted to a spindle, said apparatus comprising: an external normal pressure coolant supply line for supplying a coolant at a normal pressure to a nozzle provided outside the spindle; a spindle normal pressure coolant supply line for supplying a coolant at a normal pressure to a coolant passage passing in the interior of the spindle and extending to the tip of the gun drill; a high-pressure coolant supply line which joins the coolant passage in the spindle and supplies a coolant, whose pressure is higher than the normal pressure, to the coolant passage; line switching means for selectively opening and closing the spindle normal pressure coolant supply line, the external normal pressure coolant supply line and the high-pressure coolant supply line either singly or in any combination; and a sequence controller for performing the opening/closing switching operations of the line switching means in accordance with a process sequence specified by a program. According to the present invention, scattering of a coolant can be prevented and shavings can be discharged efficiently by switching the pressure of a coolant between a high pressure and a normal pressure, increasing the flow rate of a coolant, or selectively using an internal coolant, which is fed through an internal passage of a gun drill, and an external coolant which is jetted from outside the gun drill, according to the stage of progress of machining of a deep hole. Even the deepest hole can be machined while optimizing the supply of a coolant.

DETAILED DESCRIPTION OF THE PREFERRED EMBODIMENT

A preferred embodiment of the present invention will now be described with reference to the drawings.

Figure 1:
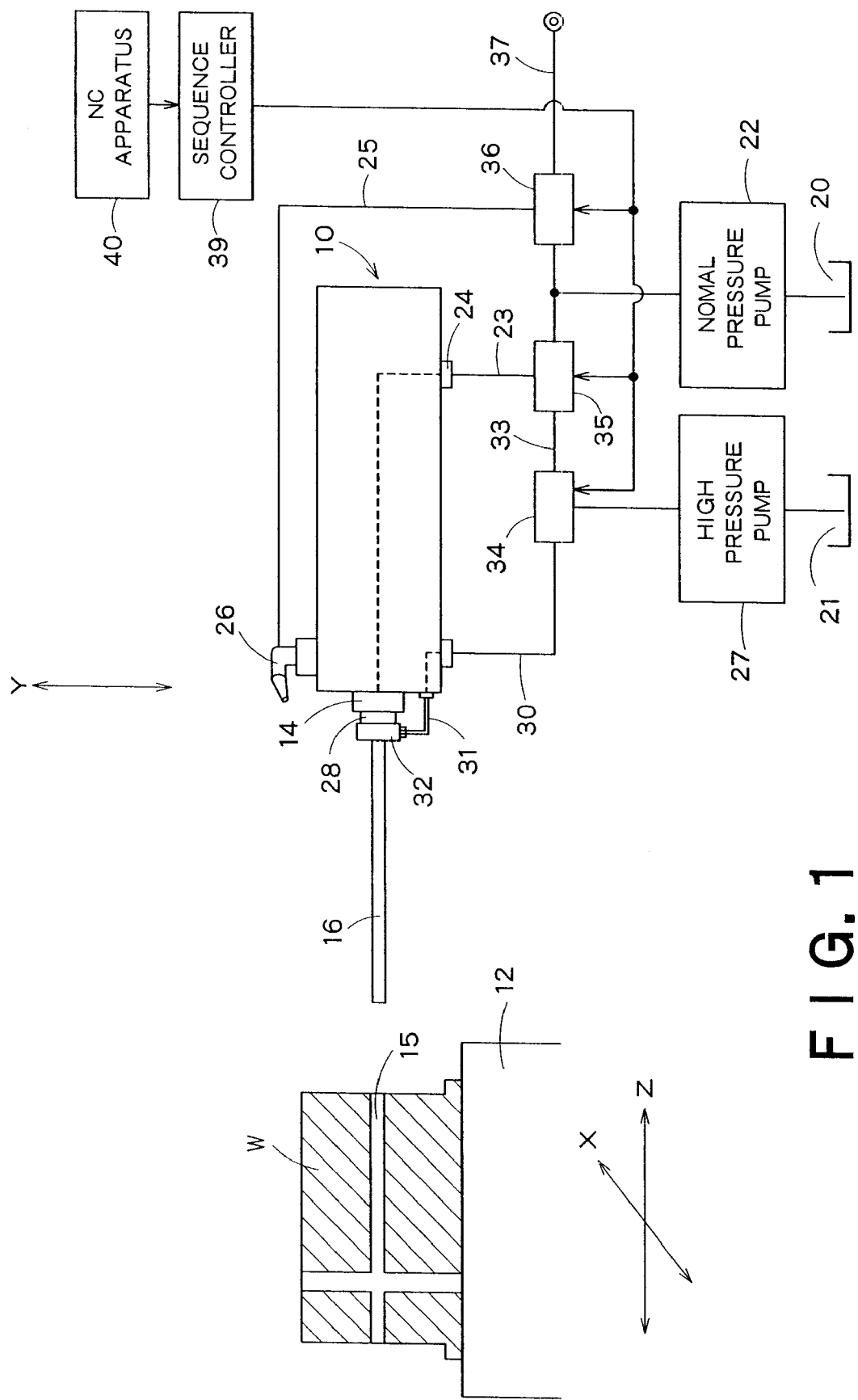
FIG. 1 is a diagram illustrating the construction of a deep hole machining apparatus according to an embodiment of the present invention.

FIG. 1 shows a deep hole machining apparatus according to an embodiment of the present invention. This embodiment relates to application of the present invention to a horizontal boring machine.

In FIG. 1, reference numeral 10 denotes the spindle head of the boring machine. The spindle head 10 is vertically-movably mounted to a not-shown column. Reference numeral 12 denotes a table on which a workpiece W is placed. X-axis is an axis for control of movement of the table 12 in the lateral direction, and Y-axis is an axis for control of vertical movement of the spindle head 10. Z-axis is an axis for control of movement of the table 12 in the longitudinal direction.

The spindle head 10 is provided with a spindle 14 in a horizontal position. When machining a deep hole 15 in the workpiece W, a gun drill 16 as a tool is mounted to the spindle 14. In this embodiment the workpiece W is a large-sized mold for molding of a bumper or an instrument panel of an automobile, and a cooling hole as the deep hole 15 is drilled through the workpiece W in the longitudinal direction. A gun drill having a length of not less than 700 mm is generally used in machining of a deep hole as in this embodiment.

The machining apparatus of this embodiment is provided with the following coolant supply system.

In FIG. 1, reference numerals 20 and 21 denote first and second tanks each storing a coolant.

The coolant in the first tank 20 is supplied at a normal pressure, for example 8 kg/cm$^2$, to a spindle normal pressure coolant supply line 23 by means of a normal pressure pump 22. The spindle normal pressure coolant supply line 23 is connected via a joint 24 to the rear end of the spindle 14, and a passage is formed coaxially extending in the interiors of the spindle 14, a tool holder 28 and the gun drill 16.

The normal pressure pump 22 supplies the coolant at a normal pressure also to an external normal pressure coolant supply line 25. The external normal pressure coolant supply line 25 supplies the coolant to a nozzle 26 provided outside the spindle 14. The coolant is jetted from the nozzle 26 toward a start point for machining of the deep hole 15 in the workpiece W.

On the other hand, the second tank 21 is provided with a high pressure pump 27, and a coolant at a high pressure relative to the normal pressure is supplied from the high pressure pump 27 to a high-pressure coolant supply line 30. In this embodiment the pressure of the coolant supplied is 16 kg/cm$^2$. In the high-pressure coolant supply line 30 is provided a pipe 31 extending to a swivel joint 32 mounted to the tool holder 28, and the high-pressure coolant is passed through the passage within the gun drill 16 and jetted from the tip of the drill. The high-pressure coolant supply line 30 joins the spindle normal pressure coolant supply line 23 via a branched line 33.

The present machining apparatus is thus provided with the three coolant supply lines, and is; also provided with the below-described electromagnetic direction-control valves 34, 35, 36 as line switching means for selectively opening and closing these lines either singly or in any combination.

The electromagnetic direction-control valve 36 is to open and close the external normal pressure coolant supply line 25 and also to switch the coolant to air which is supplied from an air supply pipe 37. The electromagnetic direction-control valve 35 opens and closes the spindle normal pressure coolant supply line 23 and, in addition, switches the flow path so that the high-pressure coolant supply line 30 joins the spindle normal pressure coolant supply line 23 via the branched line 33. The electromagnetic direction-control valve 34 opens and closes the high-pressure coolant supply line 30. The opening/closing operations of the electromagnetic direction-control valves 34, 35, 36 and start/stop operations for the normal pressure pump 22 and the high pressure pump 27 are performed by a sequence controller 3. In FIG. 1, reference numeral 40 denotes an NC apparatus.

A process for machining a deep hole by means of the deep hole machining apparatus having the above construction will now be described with reference to FIG. 2.

Figure 2:
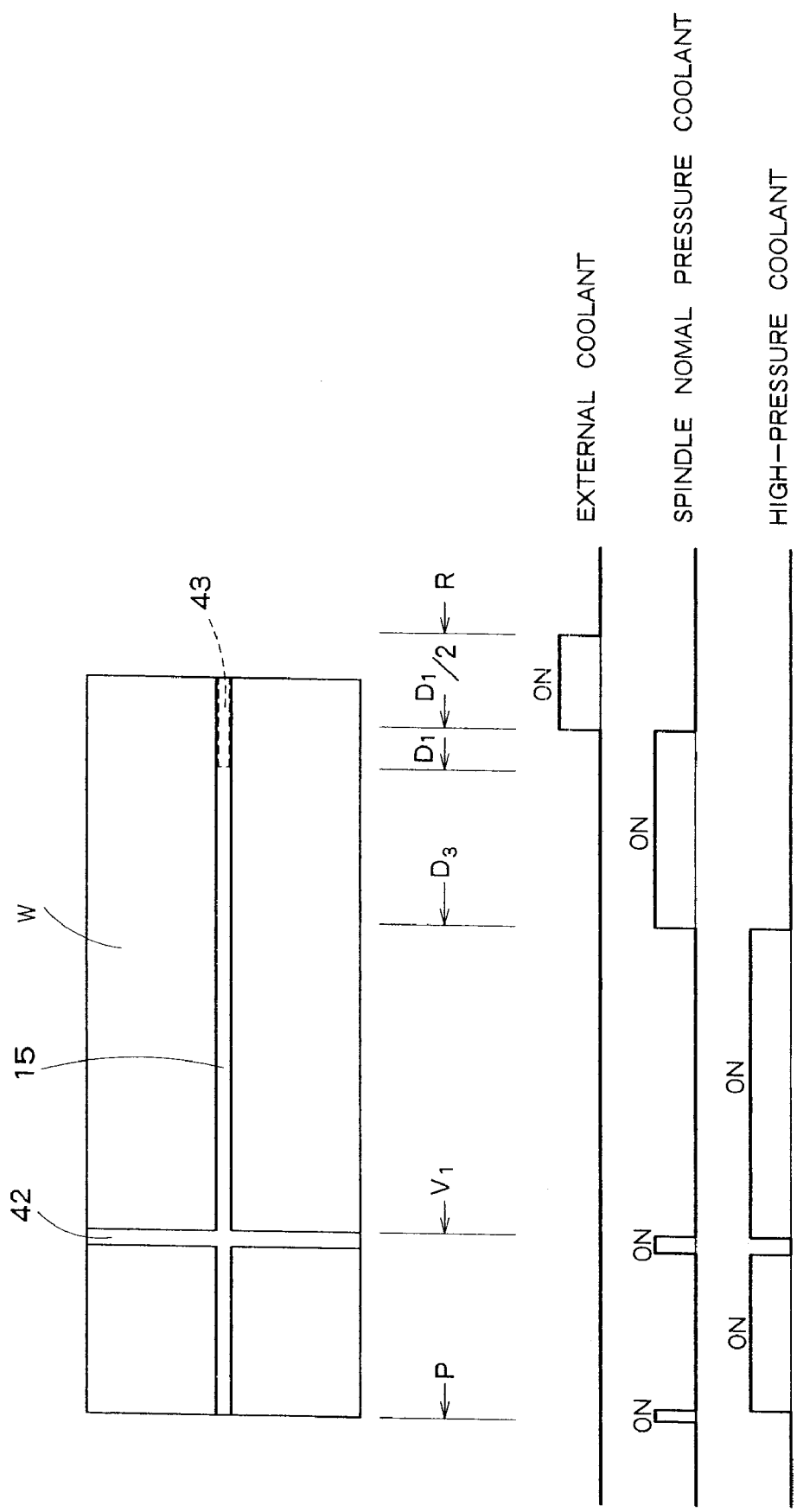
FIG. 2 is a diagram illustrating the sequence of coolant switching operations in machining of a deep hole by means of the deep hole machining apparatus.

FIG. 2 shows the sequence of coolant switching operations in the process of machining the deep hole 15 in the workpiece W. The workpiece W has four vertical holes 42 previously machined. The deep hole 15 is machined horizontally from a pilot hole 43 such that the hole 15 will penetrate the workpiece W. In a machining program for machining of the deep hole 15, a G-code is assigned the function of controlling the supply of the coolants while machining the deep hole. The G-code contains the following format of description:

G555 X_Y_Z_R_H_D_V_F_L_E

X: X coordinate value of the center of deep hole
Y: Y coordinate value of the center of deep hole
Z: final Z coordinate value of deep hole
R: cutting feed start position
H: deflection of gun drill
L: length of gun drill
D: D1 machining start position, D3 intermediate depth
V: position of hole 42
F: feed rate
E: air blow The NC apparatus 40 analyzes the thus-described program and executes position control according to the progress of machining of the deep hole, while the sequence controller 39 performs operations for switching the coolant supply lines in accordance with the sequence shown in FIG. 2.

The process of machining of the deep hole will now be described specifically.

First, the gun drill 16 is fast fed from a not-shown initial position to a cutting feed start position R as shown in FIG. 2. During the fast feeding, the gun drill 16 is not rotated and all the coolant supply lines are closed.

After the tip of the gun drill 16 has reached the cutting feed start position R, the spindle 14 is reversely rotated at a predetermined rotating speed, and fed in the z-axis direction at a specified reduced cutting feed rate. At the same time, the external normal pressure coolant supply line 25 is opened and the coolant at a normal pressure is jetted from the nozzle 26 toward a machining point.

Because the spindle 14 is reversely rotating, the cutting edge of the gun drill 16 can be prevented from cutting into the workpiece W upon entering the pilot hole 43. Further, because the coolant at a normal pressure is supplied from the external nozzle 26, too much scattering of the coolant can be prevented.

When the tip of the gun drill 16 has entered the pilot hole 43 and come to a position halfway to the bottom of the pilot hole 43, i.e. a position at a distance of D1/2 from the opening of the pilot hole 43, the electromagnetic direction-control valves 35, 36 are switched so that the external normal pressure coolant supply line 25 is closed and the spindle normal pressure coolant supply line 23 is opened, thereby jetting the normal-pressure coolant from the tip of the gun drill 16. On the other hand, the rotation of the spindle 14 is switched to normal rotation.

The gun drill 16 is further fed and starts cutting from the machining start position D1. The cutting is continued while cooling the cutting edge of the gun drill 16 and discharging shavings with the coolant supplied from the spindle normal pressure coolant supply line 23.

When the gun drill 16 has reached a specified intermediate-depth position, i.e. a position at a distance of D3 from the opening of the pilot hole 43, the electromagnetic direction-control valves 34, 35 are switched so that the spindle normal pressure coolant supply line 23 is closed and the high-pressure coolant supply line 30 is opened instead, thereby jetting the high-pressure coolant, whose pressure is higher than the normal pressure, from the tip of the gun drill 16. Depending on the conditions, such as the depth of the hole machined, etc., it is also possible open both the spindle normal pressure coolant supply line 23 and the high-pressure coolant supply line 30 so as to increase the flow rate of coolant.

Though the hole 15 becomes deeper with the progress of the machining of the hole, shavings can be discharged effectively by the high-pressure coolant jetted from the tip of the gun drill 16 to a machining point. The action of centrifugal force in addition of the high pressure enhances the ability of the coolant to discharge shavings.

When the gun drill 16 has then reached a position V1 in front of the existing hole 42, the electromagnetic valves 34, 35 are switched so that the high-pressure coolant supply line 30 is closed and the spindle normal pressure coolant supply line 23 is opened so as to reduce the coolant pressure. Thus, the coolant at a reduced (normal) pressure is jetted from the tip of the gun drill 16 when the drill enters the hole 42. This can avoid too much scattering of the coolant from the hole 42.

When the tip of the gun drill 16 has passed across the hole 42 and machining of the deep hole is resumed, the electromagnetic direction-control valves 34, 35 are switched so that the spindle normal pressure coolant supply line 23 is closed and the high-pressure coolant supply line 30 is opened, thereby supplying the high-pressure coolant. Machining of the deep hole is continued to the final depth P while supplying the high-pressure coolant.

Shortly before the tip of the gun drill 16 comes out of the workpiece W, the feed rate of the gun drill 16 is decreased, and the high-pressure coolant supply line 30 is closed and the spindle normal pressure coolant supply line 23 is opened, thereby reducing the pressure of the coolant supplied.

After the tip of the gun drill 16 has come to the final depth, i.e. the machining of the deep hole has come to completion, the spindle normal pressure coolant supply line 23 is closed, thereby stopping the supply of the coolant. Instead, the electromagnetic direction-control valve 36 is switched so that the air supply pipe 37 is connected to the spindle normal pressure coolant supply line 23, thereby jetting air, instead of the coolant, from the gun drill 16. While cleaning the hole 15 with the jetting air, the gun drill 16 is withdrawn from the deep hole, and the supply of air is stopped when the tip of the gun drill 16 has come out of the hole. The gun drill 16 is then returned to the initial position.

While the present invention has been described with reference to the embodiment in which the present invention is applied to the horizontal boring machine, the present invention is not limited to machining of a horizontal deep hole, but is also applicable to machining of a vertical or oblique deep hole.

What is claimed is:

1. A method for machining a deep hole in a workpiece by means of a machine tool having a gun drill mounted to a spindle, said method comprising:
    connecting a coolant supply system to the spindle, the system comprising a spindle normal pressure coolant supply line for supplying a coolant at a normal pressure to a coolant passage passing in the interior of the spindle and extending to the tip of the gun drill, an external normal pressure coolant supply line for supplying a coolant at a normal pressure to a nozzle provided outside the spindle, and a high-pressure coolant supply line which joins the coolant passage in the spindle and supplies a coolant, whose pressure is higher than the normal pressure, to the coolant passage;
    feeding the spindle to a deep hole machining start position while jetting the coolant toward the workpiece from the external normal pressure coolant supply line;
    closing the external normal pressure coolant supply line and opening the spindle normal pressure coolant supply line at the start of machining of the deep hole, and machining the deep hole to a predetermined intermediate depth while supplying the coolant to a machining point; and
    closing the spindle normal pressure coolant supply line and opening the high-pressure coolant supply line when the depth of the hole machined has reached the intermediate depth, and machining the deep hole to the final depth while supplying the high-pressure coolant to a machining point.

2. The deep hole machining method according to claim 1, wherein a pilot hole is machined in the workpiece prior to machining of the deep hole, and the spindle is fed fast to a position where the tip of the gun drill faces the pilot hole, and then fed to a cutting start point at a reduced cutting feed rate while reversely rotating the spindle, and the spindle is then normally rotated from the cutting stare point.

3. The deep hole machining method according to claim 1, wherein shortly before the deep hole being machined meets an existing hole, the high-pressure coolant supply line is switched to the spindle normal pressure coolant supply line, thereby reducing the pressure of the coolant supplied.

4. The deep hole machining method according to claim 1, wherein shortly before the tip of the gun drill comes out of the workpiece, the feed rate is reduced and the high-pressure coolant supply line is switched to the spindle normal pressure coolant supply line, thereby reducing the pressure of the coolant supplied.

5. The deep hole machining method according to claim 1, wherein after completion of the machining of the deep hole, the gun drill is withdrawn from the deep hole while jetting air from the spindle normal pressure coolant supply line.

6. An apparatus for machining a deep hole in a workpiece with a gun drill mounted to a spindle, said apparatus comprising: an external normal pressure coolant supply line for supplying a coolant at a normal pressure to a nozzle provided outside the spindle;
    a spindle normal pressure coolant supply line for supplying a coolant at a normal pressure to a coolant passage passing in the interior of the spindle and extending to the tip of the gun drill;
    a high-pressure coolant supply line which joins the coolant passage in the spindle and supplies a coolant, whose pressure is higher than the normal pressure, to the coolant passage;
    line switching means for selectively opening and closing the spindle normal pressure coolant supply line, the external normal pressure coolant supply line and the high-pressure coolant supply line either singly or in any combination; and
    a sequence controller for performing the opening/closing switching operations of the line switching means in accordance with a process sequence specified by a program.

7. The deep hole machining apparatus according to claim 6, wherein the sequence controller opens the external normal pressure coolant supply line when the spindle is fed fast to a deep hole machining start position, closes the external normal pressure coolant supply line and opens the spindle normal pressure coolant supply line when machining the deep hole from the start position to a predetermined intermediate depth, and closes the spindle normal pressure coolant supply line and opens the high-pressure coolant supply line when machining the deep hole from the intermediate depth to the final depth.

* * * * *